United States Patent
Boling et al.

(10) Patent No.: US 8,232,788 B2
(45) Date of Patent: Jul. 31, 2012

(54) QUASI-CONTINUOUS VOLTAGE REGULATOR AND CONTROLLER

(75) Inventors: Brian Dean Boling, Broomfield, CO (US); Tuan Van Tran, Brighton, CO (US)

(73) Assignee: Seagate Technology LLC, Cupertino, CA (US)

( * ) Notice: Subject to any disclaimer, the term of this patent is extended or adjusted under 35 U.S.C. 154(b) by 474 days.

(21) Appl. No.: 12/489,052

(22) Filed: Jun. 22, 2009

(65) Prior Publication Data

US 2010/0320987 A1    Dec. 23, 2010

(51) Int. Cl.
G05F 1/00    (2006.01)

(52) U.S. Cl. .................... 323/284; 323/267; 363/98

(58) Field of Classification Search .............. 323/222, 323/271, 282, 283, 284, 285, 344, 351, 267; 363/98
See application file for complete search history.

(56) References Cited

U.S. PATENT DOCUMENTS

| | | | | |
|---|---|---|---|---|
| 5,457,624 A * | 10/1995 | Hastings | ......... | 363/127 |
| 5,859,518 A * | 1/1999 | Vitunic | ......... | 318/701 |
| 6,275,016 B1 | 8/2001 | Ivanov | ......... | 323/224 |
| 6,348,780 B1 | 2/2002 | Grant | ......... | 323/222 |
| 6,377,034 B1 | 4/2002 | Ivanov | ......... | 323/287 |
| 6,522,110 B1 | 2/2003 | Ivanov | ......... | 323/267 |
| 6,628,109 B2 | 9/2003 | Rincon-Mora | ......... | 323/282 |
| 6,979,985 B2 * | 12/2005 | Yoshida et al. | ......... | 323/282 |
| 7,061,214 B2 | 6/2006 | Mayega et al. | ......... | 323/267 |
| 7,091,711 B2 * | 8/2006 | Yoshida et al. | ......... | 323/282 |
| 7,109,693 B2 * | 9/2006 | Yoshida et al. | ......... | 323/282 |
| 7,151,361 B2 | 12/2006 | Xi | ......... | 323/222 |
| 7,224,085 B2 | 5/2007 | Chen et al. | ......... | 307/82 |
| 7,276,886 B2 | 10/2007 | Kinder et al. | ......... | 323/267 |
| 7,391,195 B2 | 6/2008 | Tiew et al. | ......... | 323/283 |
| 7,548,047 B1 * | 6/2009 | Dasgupta et al. | ......... | 323/283 |
| 7,719,251 B2 * | 5/2010 | Qahouq et al. | ......... | 323/286 |
| 2003/0048098 A1 | 3/2003 | Tran | ......... | 323/288 |
| 2005/0110474 A1 * | 5/2005 | Ortiz et al. | ......... | 323/282 |
| 2007/0085523 A1 | 4/2007 | Scoones et al. | ......... | 323/314 |
| 2007/0114979 A1 * | 5/2007 | Chandrasekaran | ......... | 323/222 |
| 2008/0067993 A1 | 3/2008 | Coleman | ......... | 323/282 |
| 2010/0320975 A1 * | 12/2010 | Boling et al. | ......... | 323/267 |

* cited by examiner

Primary Examiner — Adolf Berhane
Assistant Examiner — Lakaisha Jackson
(74) Attorney, Agent, or Firm — Alan G. Rego; Westman, Champlin & Kelly, P.A.

(57) ABSTRACT

A controller for a voltage regulator includes a hysteretic circuit that generates a hysteretic voltage output as a function of a regulated voltage and that generates a hysteretic current output as a function of an inductor current. A switch control circuit provides a quasi-continuous control output as a function of the hysteretic current output from a start time when the regulated voltage rises above a higher hysteretic voltage until a stop time when the regulated voltage falls below a lower hysteretic voltage.

19 Claims, 12 Drawing Sheets

QUASI-CONTINUOUS VOLTAGE REGULATOR AND CONTROLLER

CROSS-REFERENCE TO RELATED APPLICATION

Reference is made to co-pending U.S. patent application Ser. No. 12/489,067, filed on Jun. 22, 2009, titled "QUASI-CONTINUOUS VOLTAGE REGULATOR WITH DUAL POLARITY OUTPUTS", for inventors Brian Boling et al., the content of which is hereby incorporated by reference.

BACKGROUND

In data storage devices, buck-boost regulators are often utilized to generate negative preamp bias voltage. Fixed frequency regulators operating in discontinuous conduction mode have historically been the solution of choice, as their design and operating characteristics are well understood within the data storage device industry. However, such implementations suffer from important shortcomings. In these discontinuous conduction mode regulators, stability requires careful control loop design, particularly at the higher loop bandwidths often necessary to achieve acceptable transient performance. Even these high bandwidth solutions provide, at best, modest transient response. Further, operating in discontinuous conduction mode necessitates relatively high peak inductor current to ensure regulator output power requirements are met.

Embodiments of the present invention provide solutions to these and other problems, and offer other advantages over the prior art.

SUMMARY OF THE INVENTION

In the embodiments described below, a controller comprises a hysteretic circuit and a switch control circuit.

The hysteretic circuit generates a hysteretic voltage output. The hysteretic voltage output is a function of a regulated voltage. The hysteretic circuit generates a hysteretic current output. The hysteretic current output is a function of an inductor current.

The switch control circuit provides a quasi-continuous control output. The quasi-continuous control output is a function of the hysteretic current output from a start time when the regulated rises above a higher hysteretic voltage until a stop time when the regulated voltage falls below a lower hysteretic voltage.

According to one aspect, a voltage regulator comprises the controller and an output circuit. The output circuit comprises an inductor and a switch. The switch couples a first polarity supply voltage to the inductor to produce an inductor current. The output circuit provides a regulated voltage that has a second polarity that is opposite the first polarity.

Other features and benefits that characterize embodiments of the present invention will be apparent upon reading the following detailed description and review of the associated drawings.

DETAILED DESCRIPTION

Unless otherwise indicated either explicitly or by context, all voltages mentioned are measured with reference to a DC common conductor. Unless otherwise indicated either explicitly or by context, various "current" signals, levels or thresholds that are within a controller and that represent current levels are not currents, but are voltages levels that represent currents within the controller.

In the embodiments described below, a quasi continuous mode buck-boost regulator is disclosed that uses hysteretic control. Both a regulated output voltage and inductor current are fed back to a controller to implement a hysteretic control algorithm. When regulated output voltage is sensed to be below a hysteretic voltage range, a latch is toggled and a high side switch is turned on, resulting in increasing inductor current. Inductor current continues to ramp upward until it exceeds a hysteretic current range, at which time, the high side switch turns off. As a magnetic field within the inductor collapses, inductor current continues to flow, and is supplied via a rectifier element to a capacitor in an output circuit. The capacitor connects to a load and provides a regulated voltage to the load. With the rectifier element conducting, inductor current decays to a predefined lower hysteretic current level, which is greater than zero. If output voltage is still out of regulation, this process of inductor current increasing and decaying repeats quasi-continuously. Otherwise, inductor current decays to zero when the regulated voltage exceeds the hysteretic voltage range. In this manner, the regulator operates in a continuous conduction mode at heavy loads and in a discontinuous conduction mode at light loads.

Since a hysteretic control scheme is utilized, no additional circuitry is required to guarantee loop stability. Further, the hysteretic controller provides excellent transient performance, with response time limited only by delays through controller logic elements. Rated output power can be delivered with appreciably lower peak inductor current than in the fixed frequency discontinuous conduction mode case. Finally, pseudo-continuous mode switching frequency is readily controlled by the selected combination of inductor value and minimum/maximum inductor current. This disclosed hysteretic, quasi-continuous voltage regulator provides a desired opposite polarity output voltage that is useful in a data storage device as well as in other applications.

Figure 1:
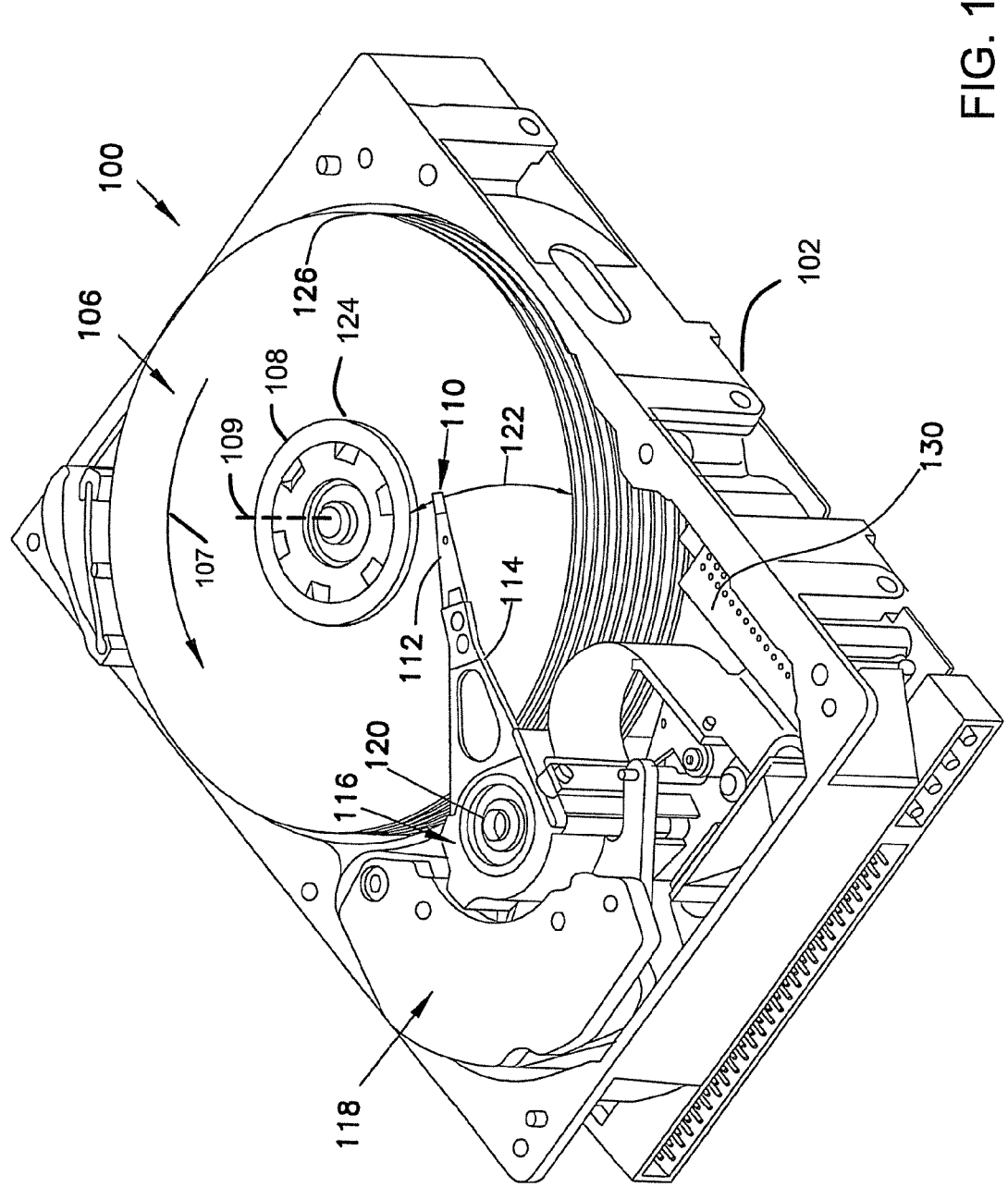
FIG. 1 illustrates an isometric view of a disc drive.

FIG. 1 is an isometric view of a disc drive 100 in which the presently disclosed voltage regulators and controllers are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about a central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
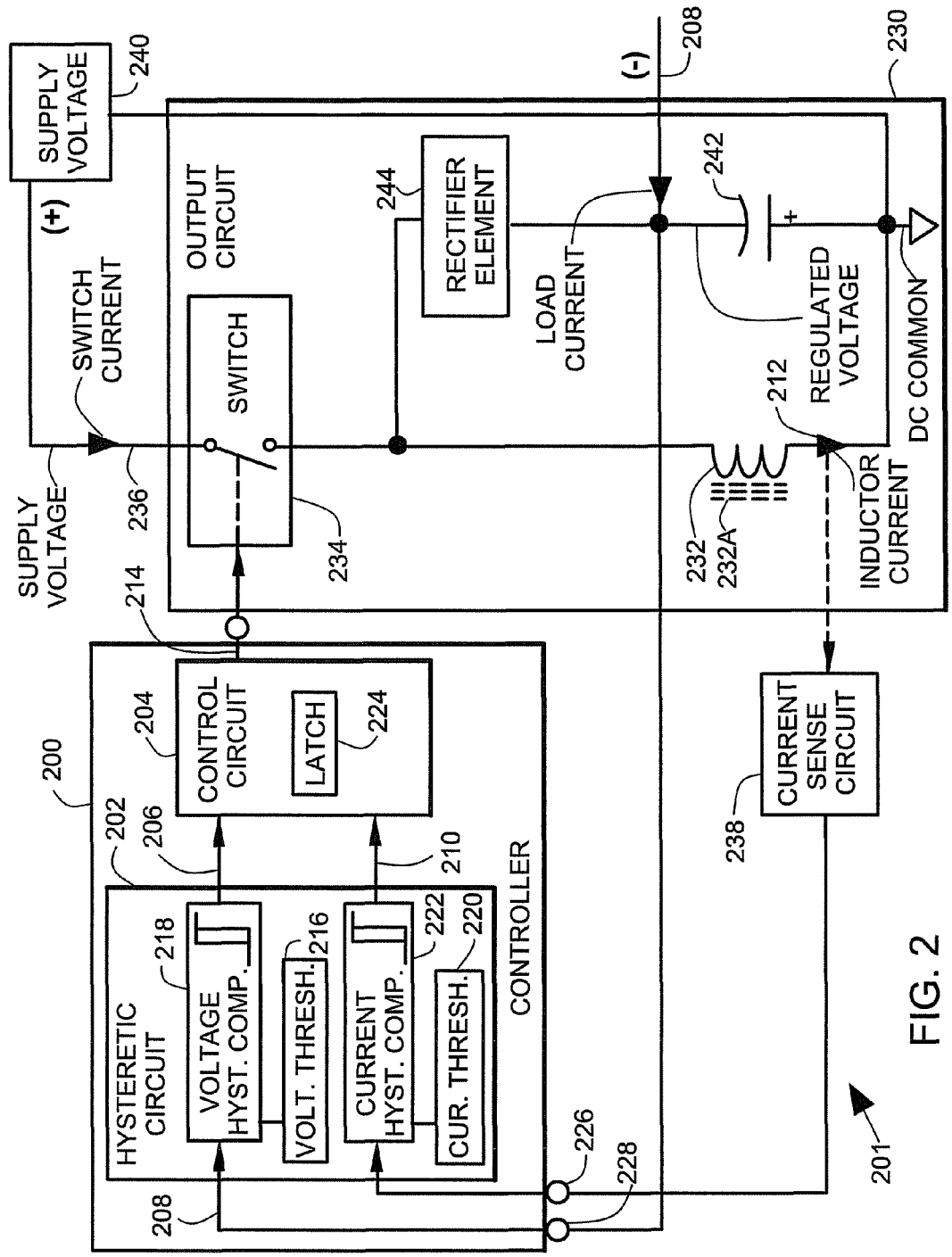
FIG. 2 illustrates a block diagram of a first voltage regulator.

FIG. 2 illustrates a voltage regulator 201 that can be used in a data storage device (such as disc drive 100 in FIG. 1) or in other devices. The voltage regulator 201 comprises a controller 200. The controller 200 comprises a hysteretic circuit 202 and a switch control circuit 204. The hysteretic circuit 202 generates a hysteretic voltage output 206 as a function of a regulated voltage 208. The hysteretic circuit 202 generates a hysteretic current output 210 as a function of an inductor current 212.

Figure 3:
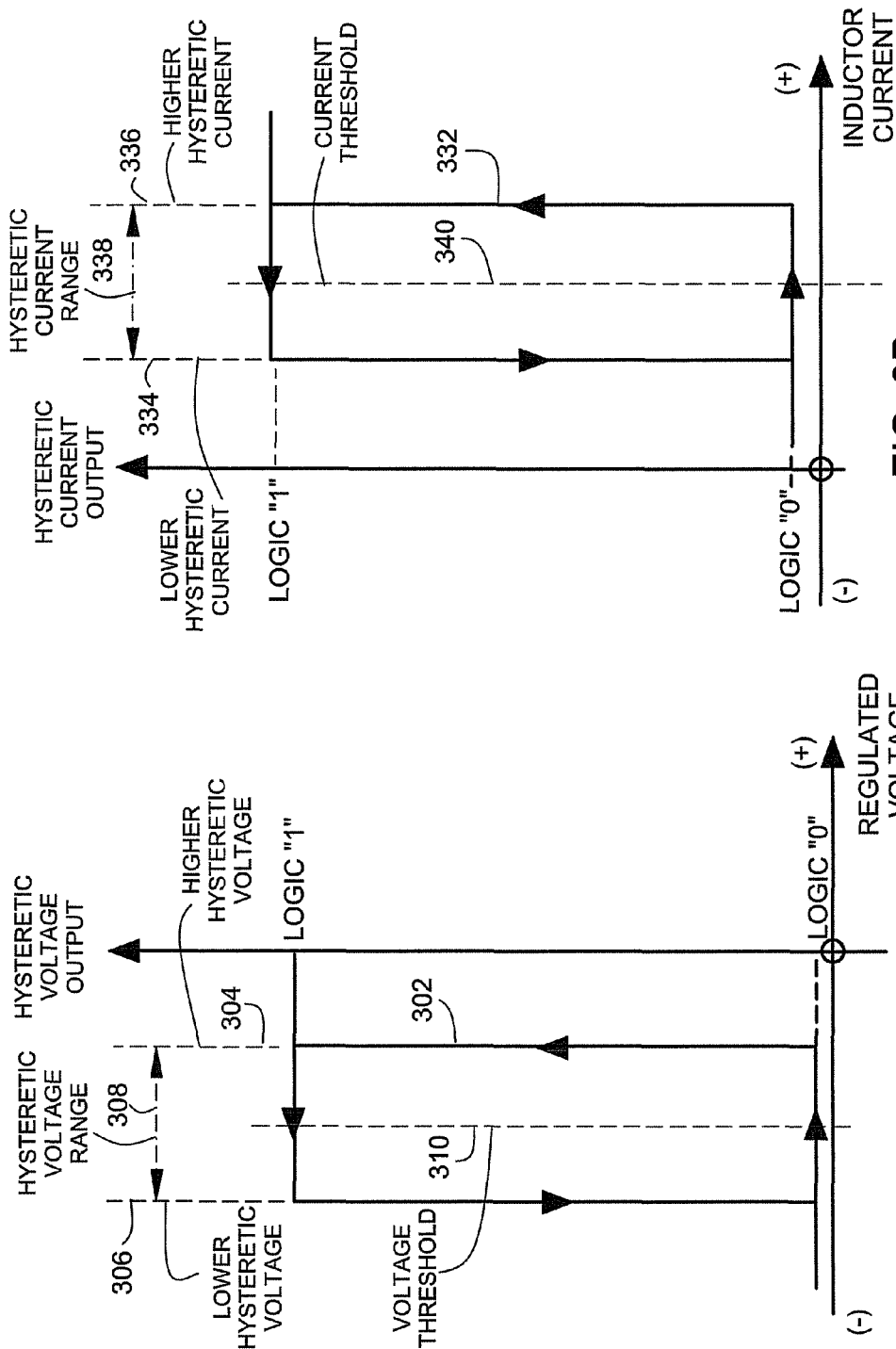
FIG. 3A illustrates a hysteresis loop that defines logic levels of a hysteretic voltage output in FIG. 2.
FIG. 3B illustrates a hysteresis loop that defines logic levels at the hysteretic current output in FIG. 2.

The switch control circuit 204 provides a quasi-continuous control output 214 as a function of the hysteretic current output 210 from a start time when the regulated voltage 208 rises above a higher hysteretic voltage 304 (FIG. 3A) until a stop time when the regulated voltage 208 falls below a lower hysteretic voltage 306 (FIG. 3A). The quasi-continuous control output 214 shuts off the switch 234 when the regulated voltage 208 rises above the higher hysteretic voltage (306, FIG. 3A). As illustrated in FIG. 3A, the higher and lower hysteretic voltages 304, 306 are both negative voltages. The higher hysteretic voltage 304 is closer to zero that the lower hysteretic voltage 306. The stop time and start time are described in more detail below by way of an example illustrated in FIG. 7.

The hysteretic circuit 202 comprises a voltage threshold 216 coupled to a hysteretic voltage comparator 218. The hysteretic circuit 202 comprises a current threshold 220 coupled to a hysteretic current comparator 222. The switch control circuit 204 comprises a latch 224 that controls the quasi-continuous control output 214.

The controller 200 comprises a current sensor input pin 226 coupled to the hysteretic current comparator 222. The controller 200 comprises a regulated voltage input pin 228 coupled to the hysteretic voltage comparator 218. The hysteretic circuit 202 generates the hysteretic voltage output 206 as a function of the regulated voltage input at pin 228 and generates the hysteretic current output 210 as a function of sensed inductor current at pin 226.

The voltage regulator 201 comprises an output circuit 230 which carries inductor current and load current. The output circuit 230 comprises an inductor 232 and a switch 234 that couple a first polarity supply voltage 236 to the inductor 232 to produce the inductor current 212. The output circuit 230 provides the opposite polarity regulated voltage 208. The first polarity supply voltage 236 is provided by a supply voltage source 240. According to one aspect, the supply voltage source 240 comprises a host computer system in which the data storage device (and its associated voltage regulator 201 illustrated in FIG. 2) is installed.

The output circuit comprises a capacitor 242 and a rectifier element 244 that rectifies current that flows between the inductor 232 and the capacitor 242. A load is connected to the capacitor 242. A current sense circuit 238 senses the inductor current 212 and provides a voltage representative of inductor current at pin 226 which couples to an input of the hysteretic current comparator 222.

According to one aspect, the inductor 232 comprises a soft magnetic core is 232A. According to another aspect, the core 232A comprises ferrite. According to yet another aspect, the core 232A comprises a toroid core or cup core formed of ferromagnetic material. The use of a soft magnetic core 232A increases the efficiency (Q) of the inductor, reduces the physical size of the inductor, and increases the efficiency of the voltage regulator.

The controller 200 advantageously has only two input pins 226 and 228, and one output pin which provides the quasi-continuous control output 214. Because the controller 200 has only three signal pins, it can be conveniently included in an integrated circuit that includes other data storage device functions without using up an excessive number of pins of the integrated circuit. The discrete circuit elements outside the integrated circuit include only a single switch 234, a single inductor 232, a single rectifier element 244, a single capacitor 242 and a current sensor 238. The use of scarce printed circuit board real estate is thus desirably low. According to another aspect, the switch 234 or the current sensor 238 can also be integrated into the integrated circuit which includes the controller 200, further reducing external component count FIG. 3A illustrates a hysteresis loop 302 that defines logic levels "1" and "0" at the hysteretic voltage output 206 (FIG. 2) as a function of the regulated voltage 208 (FIG. 2). As the regulated voltage 208 rises above a higher hysteretic voltage 304, the hysteretic voltage output 206 changes to a "1" logic level, which starts the quasi-continuous mode. As the regulated voltage 208 drops below a lower hysteretic voltage 306, the hysteretic voltage output 206 changes to a "0" logic level, which stops the quasi-continuous mode. A hysteretic voltage range 308 from the lower hysteretic voltage 306 to the higher hysteretic voltage 304 defines a range of hysteretic regulation of the regulated voltage 208. The hysteresis loop 302 is approximately centered about a voltage threshold level 310 that is generated by voltage threshold 216 (FIG. 2).

FIG. 3B illustrates a hysteresis loop 332 that defines logic levels "1" and "0" at the hysteretic current output 210 (FIG. 2) as a function of the inductor current 212 (FIG. 2). As the inductor current 212 drops below a lower hysteretic current 334, the hysteretic current output 210 changes to a "0" logic level, which turns on the switch 234 to increase inductor current. As the inductor current 212 rises above a higher hysteretic current 336, the hysteretic voltage output 206 changes to a "1" logic level, which shuts off the switch 234 so that inductor current flows through the rectifier element 244 to the load. A hysteretic current range 338 from the higher hysteretic current 336 to the lower hysteretic current 334 defines a range of hysteretic regulation of the inductor current 212 (FIG. 2). The hysteresis loop 332 is approximately centered about a current threshold level 340 that is provided by the current threshold source 220.

Figure 4:
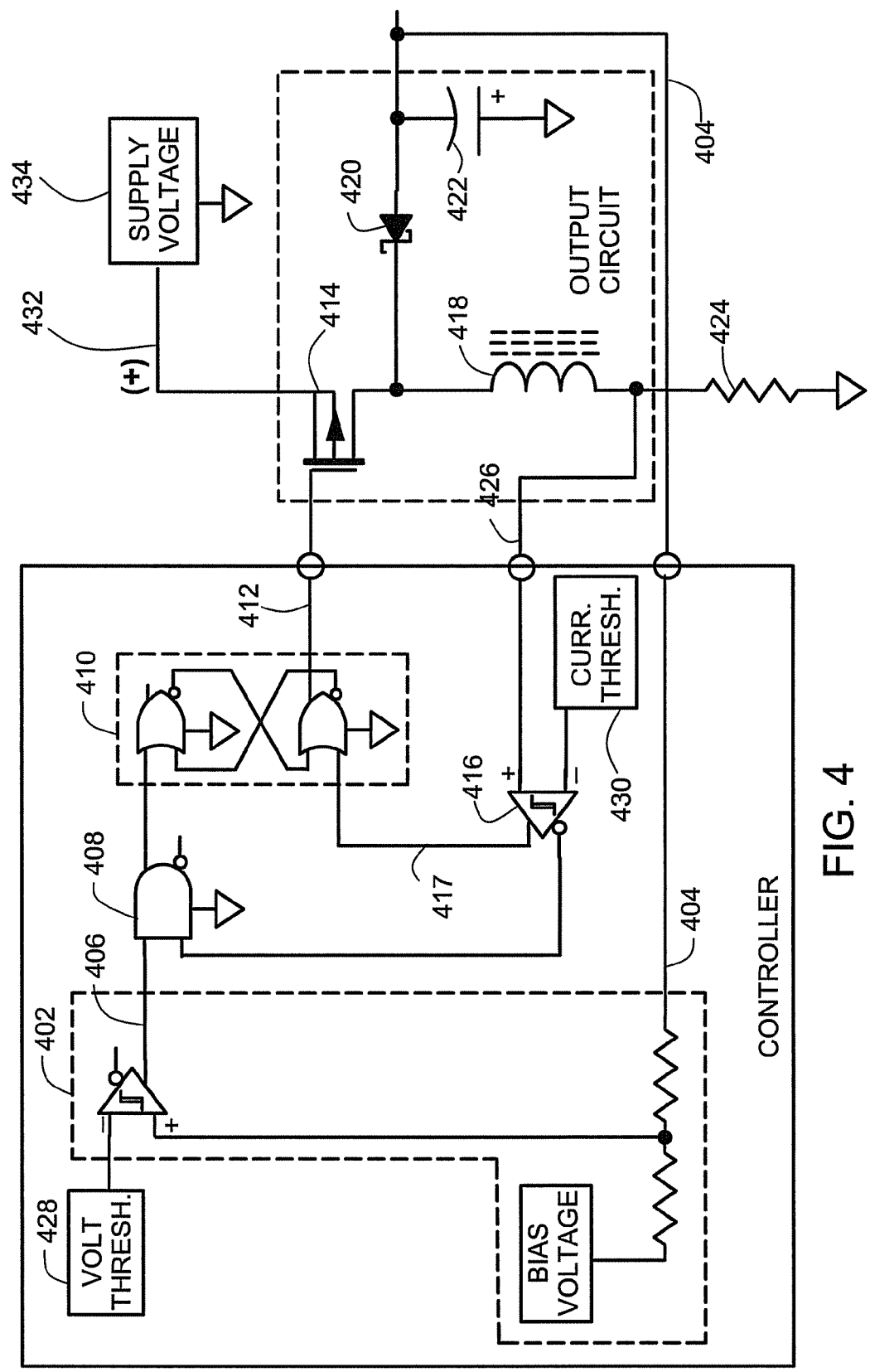
FIG. 4 illustrates a simplified schematic of a voltage regulator with asynchronous rectification.
Figure 8:
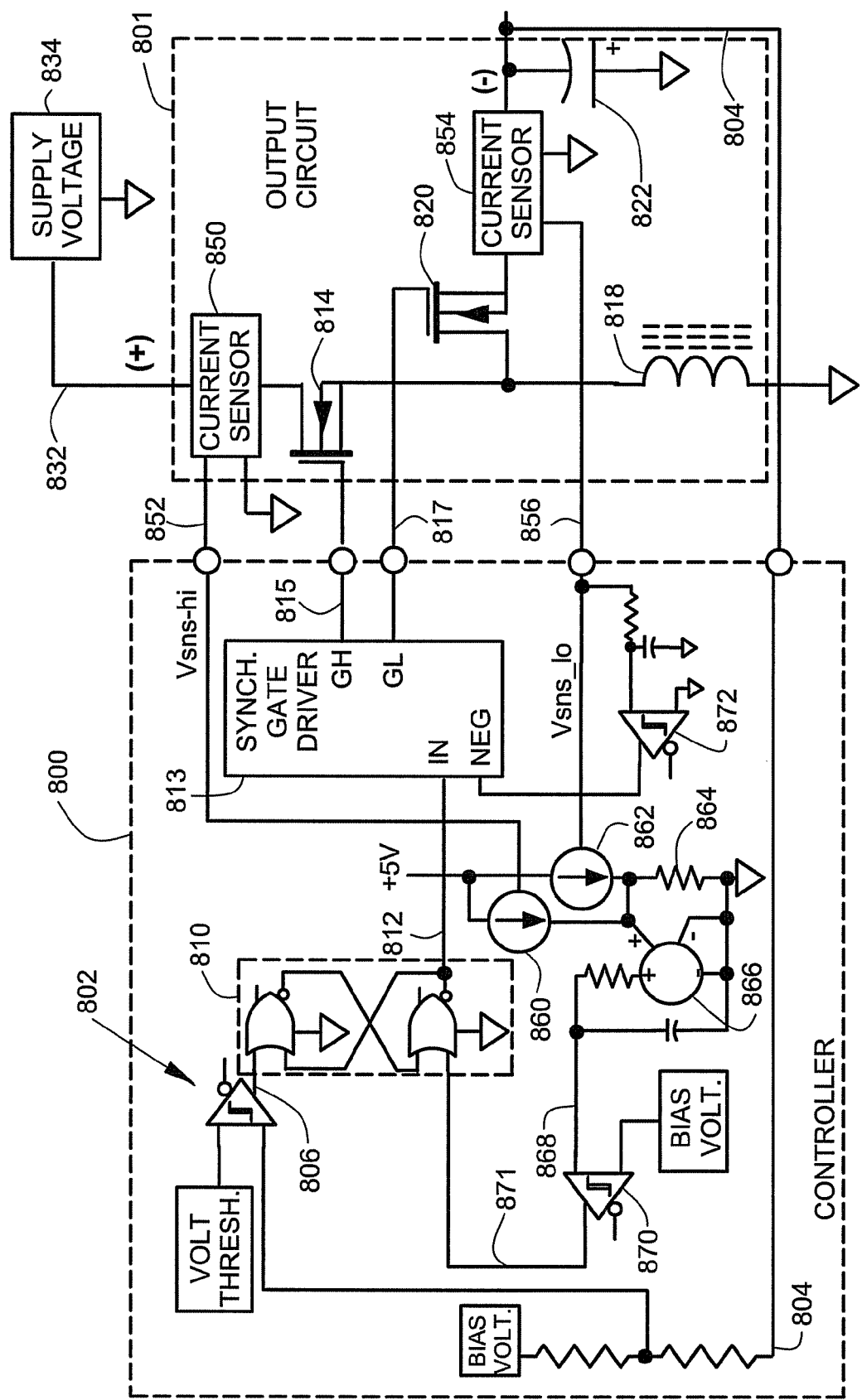
FIG. 8 illustrates a simplified schematic of a voltage regulator with synchronous rectification.

The operation of the voltage regulator illustrated in FIGS. 2, 3A, 3B is described in more detail below by way of exemplary circuits shown in FIGS. 4 and 8. In FIG. 4, a sense resistor 424 is utilized to sense inductor current, and the regulator operates asynchronously, with a diode 420 performing an asynchronous rectification function. In FIG. 8, synchronous rectification is used, and current sensors 850, 854 are used instead of a sense resistor. The topologies shown in FIG. 4, FIG. 8 or other topologies can be selected based on complexity, system level cost, and efficiency. While the sense resistor based solution in FIG. 4 is less complex from the controller standpoint, the sense resistor is a relatively costly component Additionally, the efficiency of the synchronous configuration in FIG. 8 is superior to the asynchronous sense resistor based configuration.

FIG. 4 illustrates a representative implementation of the asynchronous sense resistor based solution in schematic form. A hysteretic voltage comparator 402 senses regulated output voltage 404 and provides a hysteretic voltage output 406. The hysteretic voltage output 406 couples to an input of an AND gate 408. When the regulated output voltage 404 rises above a higher hysteretic voltage (304 in FIG. 3A), a latch 410 is toggled and provides a quasi-continuous control output 412 until the regulated output voltage 404 falls below a lower hysteretic voltage (306 in FIG. 3A). The quasi-continuous control output 412 repetitively turns on the high side switch field effect transistor 414. According to one aspect, the latch 410 comprises cross-coupled NOR gates as illustrated.

A hysteretic current comparator 416 and the AND gate 408 maintain inductor current moving back and forth between a higher hysteretic current level (336 in FIG. 3B) and a lower hysteretic current level (334 in FIG. 3B) while regulated output voltage 404 is out of regulation. The hysteretic current comparator 416 provides a hysteretic current output 417 to the latch 410. Once the regulated output voltage 404 has gone out of regulation by rising above level 304, quasi-continuous operation continues until output voltage 404 reaches the lower hysteretic voltage 306.

A Schottky diode 420 serves as a rectifier element and couples between the field effect transistor 414 and a capacitor 422. A resistor 424 serves as a current shunt that senses inductor current and provides a voltage output on line 426 that represents inductor current level. A predetermined voltage threshold 428 and a predetermined current threshold 430 provide thresholds for the hysteretic comparators 402, 416.

According to one aspect, a lower hysteretic current level is approximately 500 mA, and a higher hysteretic current level is 1 A. These levels of current through the inductor 418 are sufficient to provide continuous 250 mA output current at a −5V regulated output voltage. A supply voltage source 434 provides a positive supply voltage 432 to the switch 414. The regulated voltage on capacitor 422 has an opposite (negative) polarity.

Figure 5:
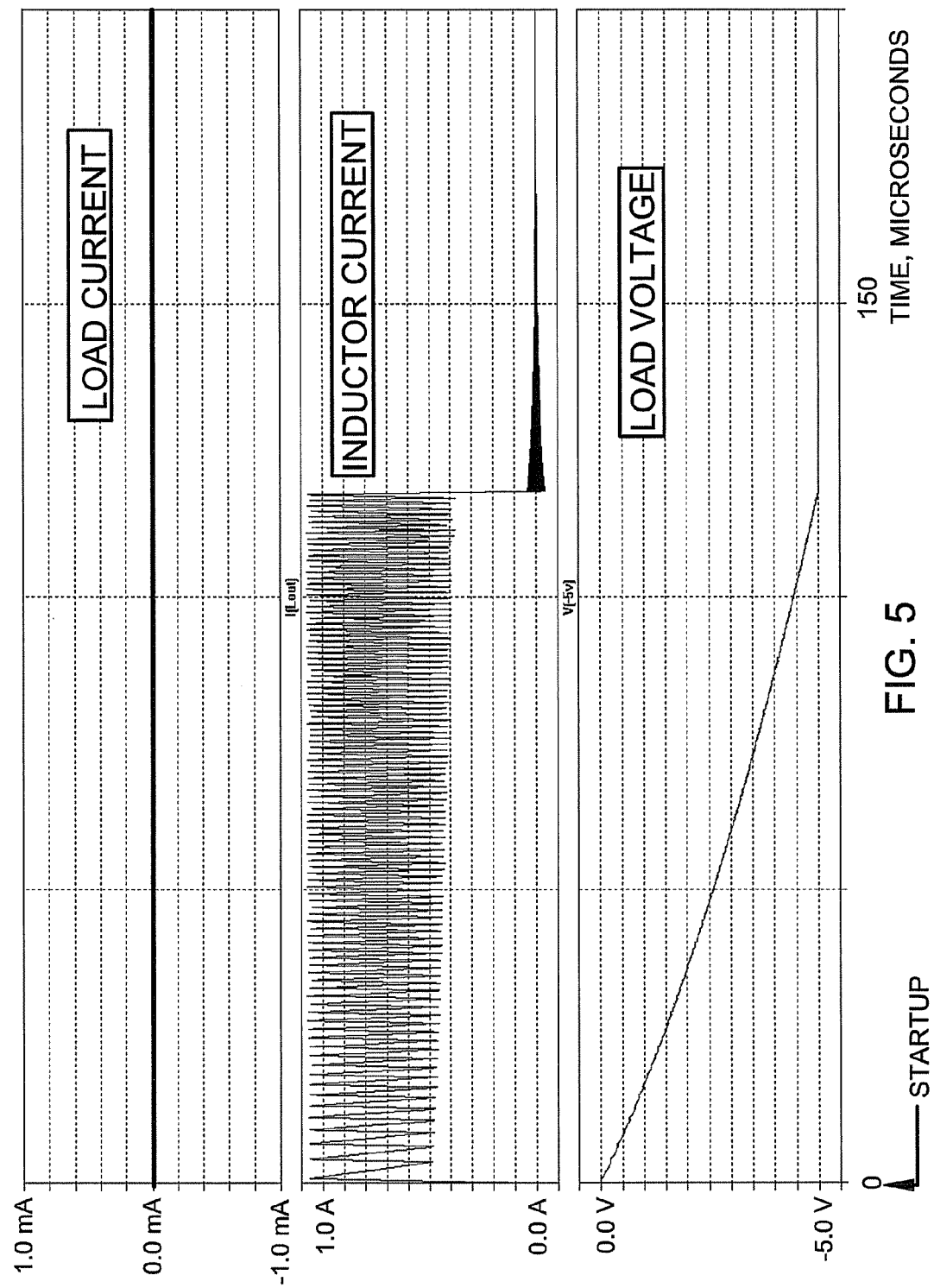
FIG. 5 illustrates a simulated soft start of the circuit of FIG. 4.

FIG. 5 is an exemplary simulation that illustrates soft start performance of the circuit of FIG. 4. The simulation result in FIG. 5 comprises regulated load current, inductor current and regulated load voltage and is arranged as a timing diagram. As illustrated, at startup and under regulated load current at 0.0 mA conditions, the regulated load voltage increases smoothly, charging capacitor 422 (FIG. 4) from 0.0 to −5.0 volts. This "soft start" is inherent to the quasi-continuous hysteretic circuit in FIG. 5. No additional components are needed to limit peak inductor current to provide a soft start.

Figure 6:
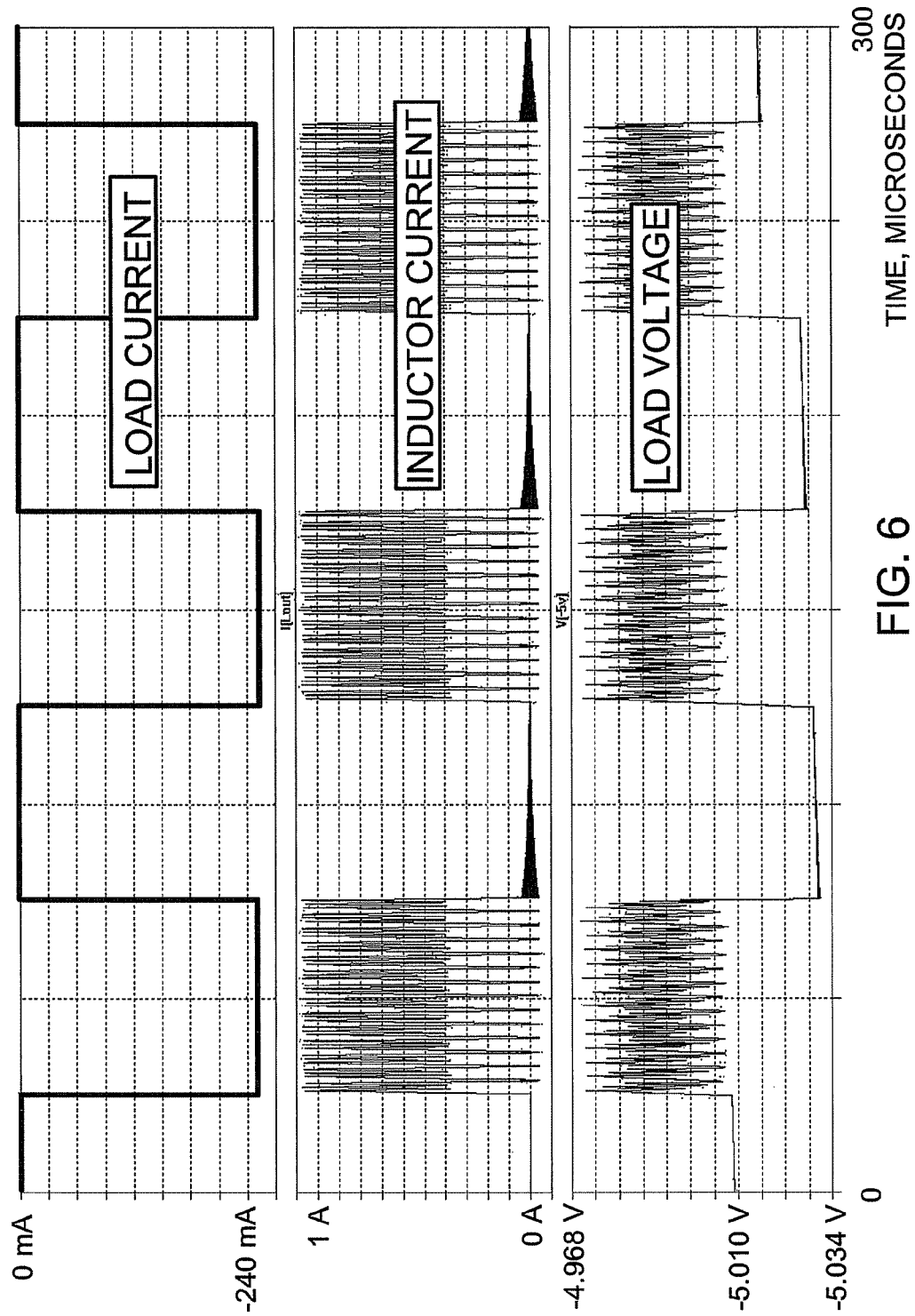
FIG. 6 illustrates a simulated transient performance of the circuit in FIG. 4.

FIG. 6 is an exemplary simulation that illustrates transient performance of the circuit in FIG. 4. In FIG. 6, load current transitions between 0 and −250 mA at a 100 microsecond rate, and with 50% duty cycle. Under these transient load conditions, the regulated load voltage remains in a range between −4.968 volts and −5.034 volts.

Figure 7:
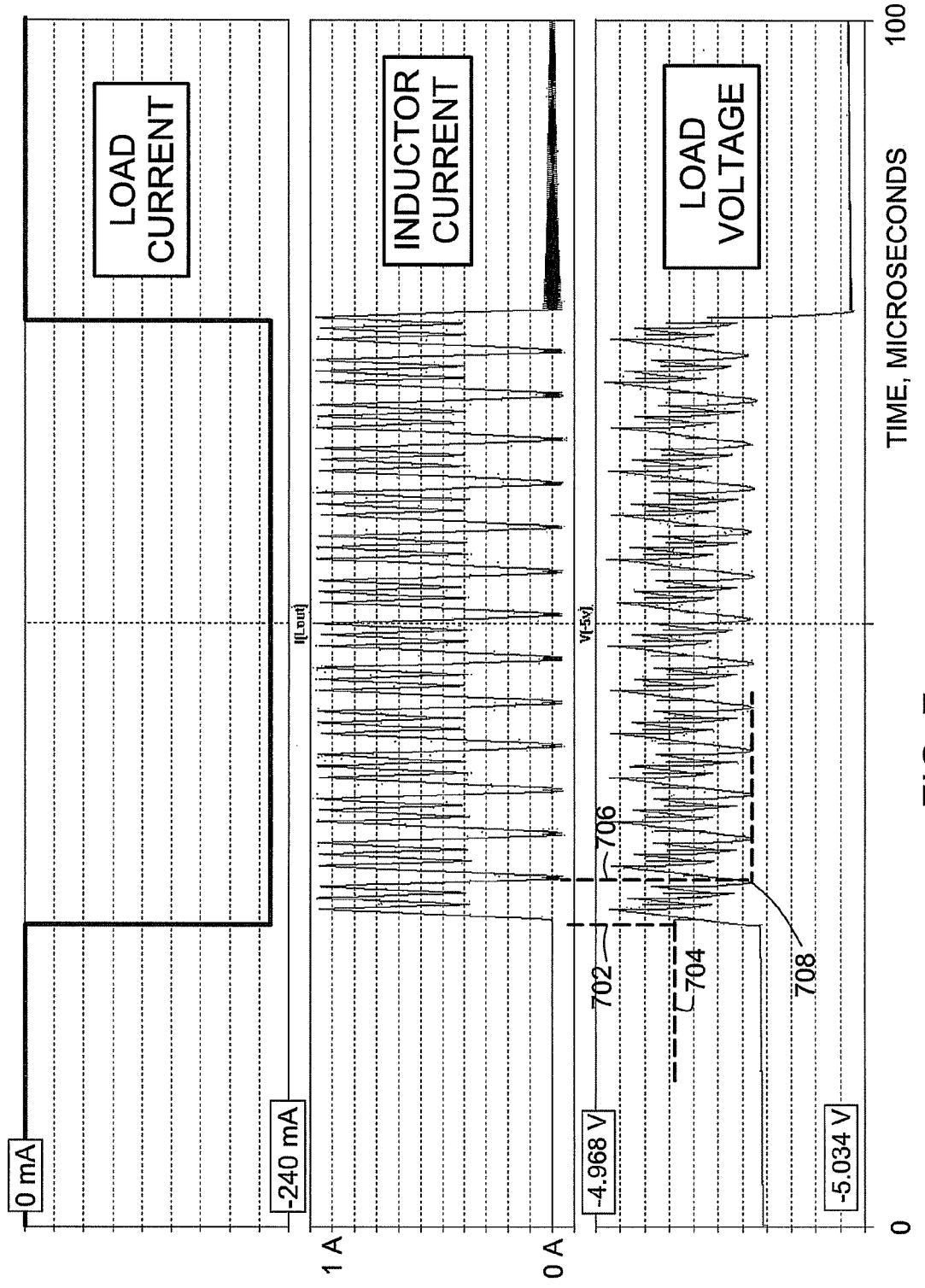
FIG. 7 illustrates an expanded view of the simulation waveforms in FIG. 6.

FIG. 7 illustrates an expanded view of FIG. 6, with pseudo continuous mode operation shown at rated regulated output current of −250 mA. The switch control circuit 410 (FIG. 4) provides a quasi-continuous control output 412 (FIG. 4) as a function of the hysteretic current output 417 from a start time 702 (FIG. 7) when the regulated voltage 404 rises above a higher hysteretic voltage 704 (FIG. 7) until a stop time 706 (FIG. 7) when the regulated voltage 404 falls below a lower hysteretic voltage 708 (FIG. 7). The quasi-continuous control output 412 shuts off the switch 414 when the regulated voltage 404 falls below the lower hysteretic voltage (708, FIG. 7).

According to one aspect, quasi-continuous switching frequency of the inductor current is on the order of 1 MHz using a 4.7 microHenry inductor. In contrast, known discontinuous mode buck-boost regulator operating at a fixed 1 MHz switching rate would require a smaller inductor and appreciably higher peak inductor current (1.5 microHenry and approximately 1.5 A) to support the same load current. Various types of switches can be used such as field effect transistors, bipolar transistors or other known discrete or integrated switches.

FIG. 8 illustrates a simplified schematic of a voltage regulator with synchronous rectification. The voltage regulator comprises a controller 800 and an output circuit 801.

The controller 800 comprises a hysteretic voltage comparator 802. The hysteretic voltage comparator 802 is similar to the hysteretic voltage comparator 402 in FIG. 4 and is used to sense a regulated output voltage 804. Voltage regulation is maintained by use of the hysteretic voltage comparator 802. The hysteretic voltage comparator 802 provides a hysteretic voltage output 806 that couples to an input of a latch 810. The latch 810 is similar to the latch 410 in FIG. 4. The latch 810 provides a latch output 812 that couples to a synchronous gate driver 813. The synchronous gate driver 813 provides a first output 815 (GH) that couples to a gate of a first field effect transistor 814. The first field effect transistor 814 functions as a switch that switches inductor current. The synchronous gate driver 813 provides a second output 817 (GL) that couples to a gate of a second field effect transistor 820. The second field effect transistor 820 functions as a synchronous rectifying element.

The output circuit 801 comprises the first field effect transistor 814, the second field effect transistor 820, an inductor 818 and a capacitor 822. A supply voltage source 834 provides a positive supply voltage 832 to the output circuit 801. The field effect transistor 814 switches the supply voltage 832 to the inductor 818. According to another aspect, both field effect transistors (814 and 820), along with associated current sensors (850 and 854), are integrated into an integrated circuit that includes the controller 800.

The first current sensor 850 senses a portion of inductor current that flows through the first field effect transistor 814. The first current sensor 850 provides a first current sensor output 852 (Vsns-hi). A second current sensor 854 senses a portion of inductor current that flows through the second field effect transistor 820. The second current sensor 854 provides a second current sensor output 856 (Vsns-lo). The first current sensor output 852 couples to a control input of a first controlled current source 860. The second current sensor output 856 couples to a control input of a second controlled current source 862. Output currents from the first and second controlled current sources 860, 862 are combined and flow through a resistor 864. A voltage representative of inductor current is produced across the resistor 864, and is coupled to a voltage sensing input of a controlled voltage source 866. The controlled voltage source 866 produces an output voltage 868 that is representative of the inductor current. The output voltage 868 that represents inductor current is coupled to a hysteretic current comparator 870. A hysteretic current output 871 of the hysteretic current comparator 870 couples to an input of the latch 810. The controlled current sources 860, 862, the resistor 864, and the controlled voltage source 866, taken together, comprise a ramp generator that generates voltage ramps that represent inductor current amplitude.

In order to maintain high efficiency, the rectifier element (second field effect transistor 820) is held in an off state when inductor current changes polarity. This function of holding the second field effect transistor 854 in an off state is performed by the synchronous gate driver 813 and a hysteretic comparator 872 which senses that the second current sensor output 856 is in a hysteretic range less than zero volts (DC common). The hysteretic comparator 872 functions a "rectifier negative current sense" circuit. The synchronous gate driver 813 prevents concurrent conduction of the two switching elements 814, 820. According to one aspect the switching elements 814, 820 comprise N-channel FET switching devices, with a floating gate drive (i.e. output referenced) necessary to appropriately control the high side device.

Figure 9:
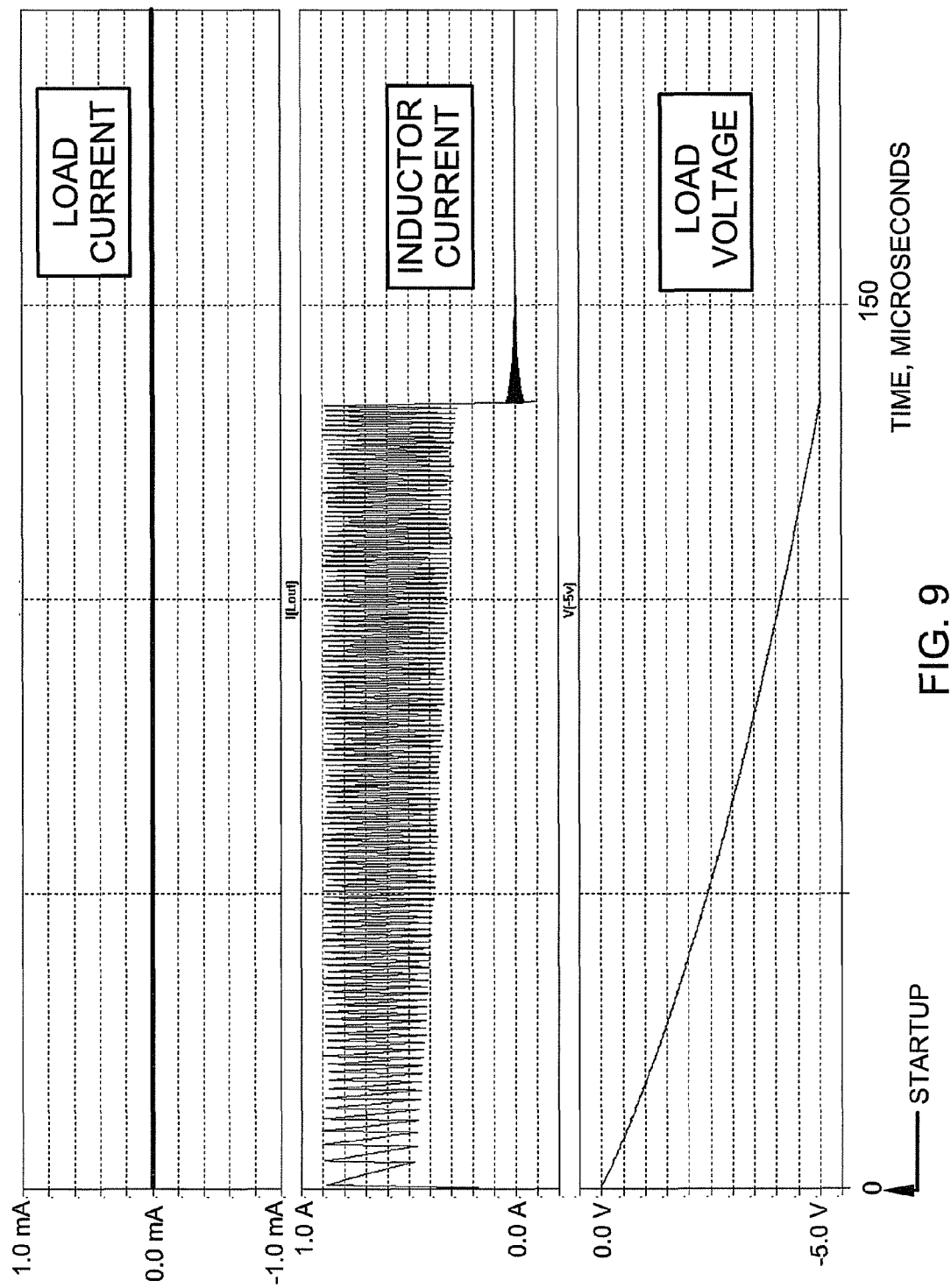
FIG. 9 illustrates a simulated soft start of the circuit of FIG. 8.

FIG. 9 is an exemplary simulation that illustrates soft start performance of the circuit of FIG. 8. The simulation result in FIG. 9 comprises regulated load current, inductor current and regulated load voltage and is arranged as a timing diagram. As illustrated, at startup and under regulated load current at 0.0 mA conditions, the regulated load voltage increases smoothly from 0.0 to −5.0 volts. This "soft start" is inherent to the quasi-continuous hysteretic circuit in FIG. 8. No additional components are needed to limit peak inductor current to provide a soft start.

Figure 10:
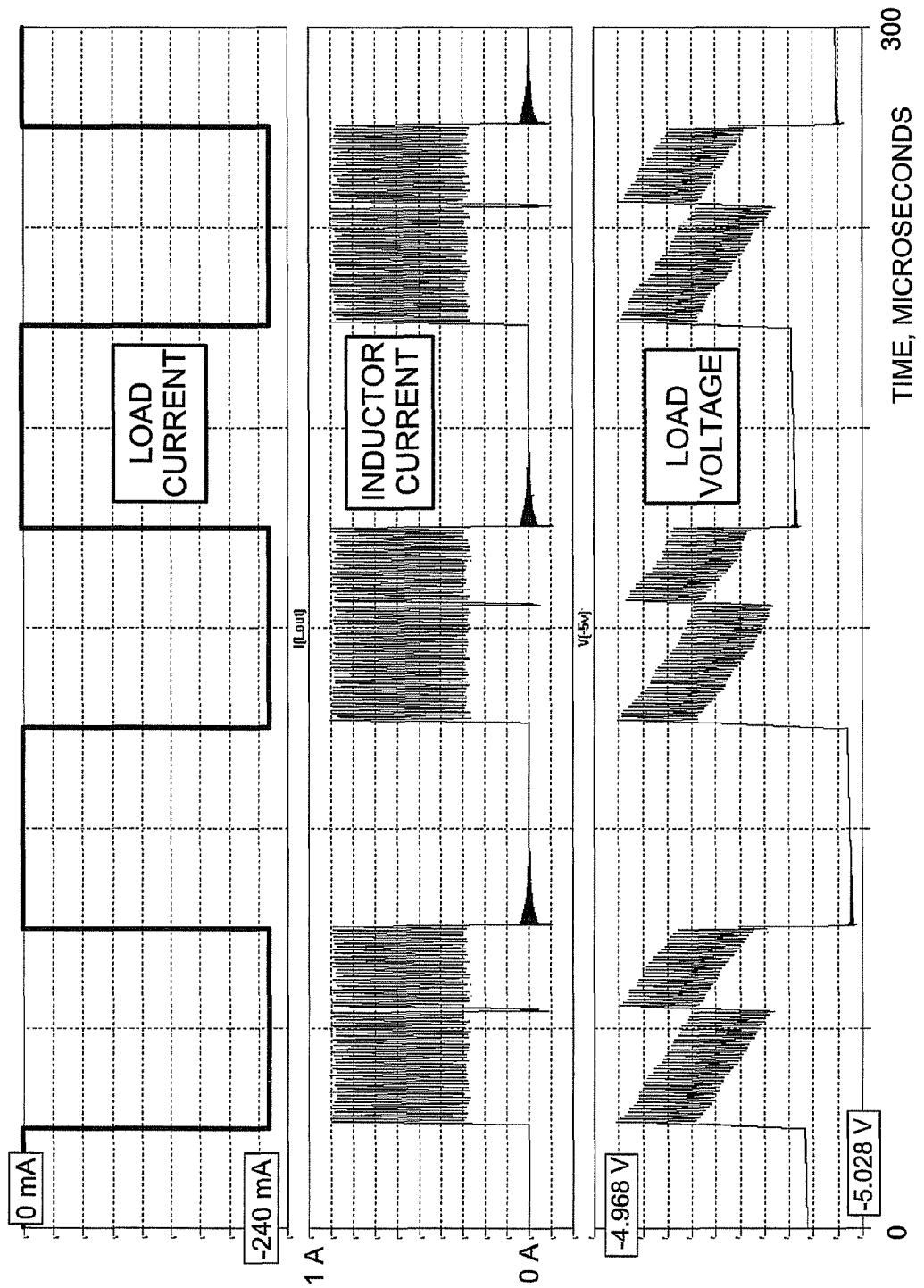
FIG. 10 illustrates a simulated transient performance of the circuit in FIG. 8.
Figure 11:
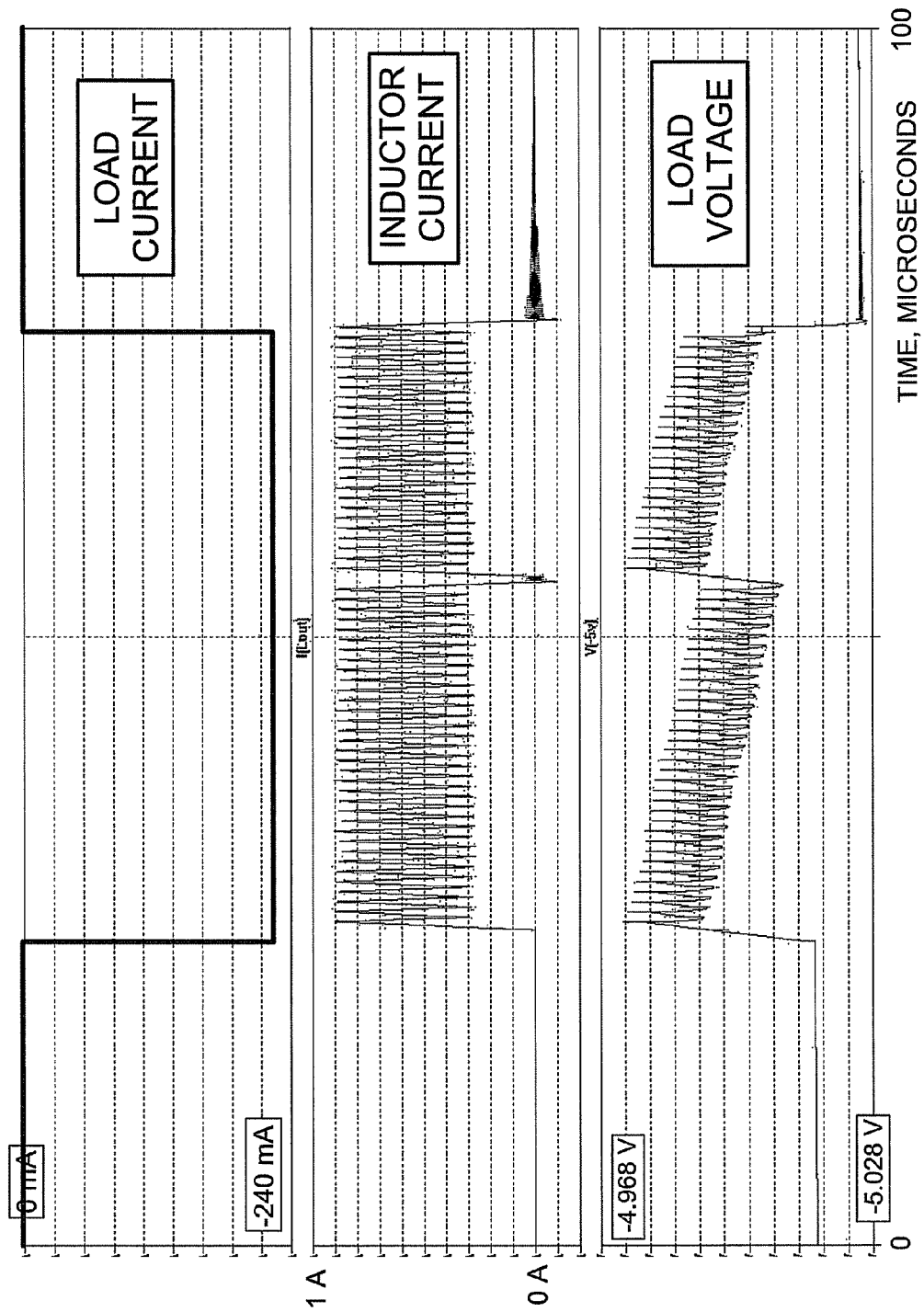
FIG. 11 illustrates an expanded view of the simulation waveforms of FIG. 10.

FIG. 10 is an exemplary simulation that illustrates transient performance of the circuit in FIG. 8. In FIG. 10, load current transitions between 0 and −250 mA at a 100 microsecond rate, and with 50% duty cycle. Under these transient load conditions, the regulated load voltage remains in a range between −4.968 volts and −5.028 volts. FIG. 11 illustrates an expanded view of FIG. 10, with pseudo continuous mode operation shown at rated regulated output current of −250 mA.

According to one aspect, quasi-continuous switching frequency of the inductor current is on the order of 1.2 MHz using a 4.7+/−30% microHenry inductor. In contrast, known discontinuous mode buck-boost regulator operating at a fixed 1 MHz switching rate would require a smaller inductor and appreciably higher peak inductor current (1.5 microHenry and approximately 1.5 A) to support the same load current. Due to reduced rectifier losses, the synchronous circuit in FIG. 8 is capable of delivering rated output power with lower peak inductor current than in the asynchronous circuit in FIG. 4.

Figure 12:
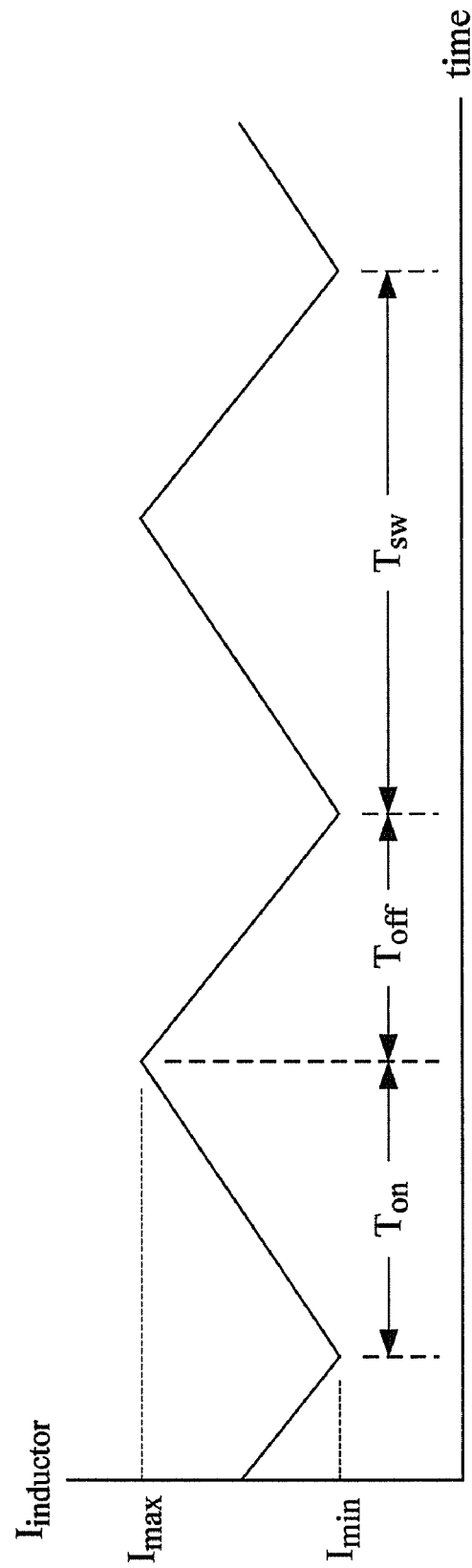
FIG. 12 illustrates a simplified timing diagram of inductor current in the disclosed voltage regulator.

For the circuits in FIGS. 2, 4 and 8 operating in pseudo-continuous conduction mode, inductor current is as shown in the simplified timing diagram of FIG. 12. Neglecting circuit resistance, inductor current "i" is described by the relationship of Equation 1, where V is voltage imposed on the inductor and L is inductor value in Henrys.

$$V = L * \frac{di}{dt} \approx L * \frac{\Delta i}{\Delta t} \quad \text{Eq. 1}$$

Substituting parameters and solving Equation 1 for off-time results in Equation 2, where it is understood that Vdiode is approximately 0.3V when using a Schottky diode as a rectification element. In the case of synchronous rectification, Vdiode is assumed negligible. As detailed in Equation 3, on-time may be estimated in a similar fashion. Finally, ideal switching period is estimated as the sum of on and off times.

In practical application, delay through the comparator, logic, and gate drive circuits is non zero, and this delay may be included to provide a more accurate switching period estimate. Switching element, inductor, and parasitic resistances may also be incorporated in the inductor current equation to produce a more refined estimate.

$$T_{off} \approx \frac{L * (I_{max} - I_{min})}{V_{out} + V_{diode}} = \frac{L * I_{ripple}}{V_{out} + V_{diode}} \quad \text{Eq. 2}$$

$$T_{on} \approx \frac{L * I_{ripple}}{V_{supply}} \quad \text{Eq. 3}$$

$$T_{SW} \approx T_{off} + T_{on} \quad \text{Eq. 4}$$

It is to be understood that even though numerous characteristics and advantages of various aspects have been set forth in the foregoing description, together with details of the structure and function of various aspects, this disclosure is illustrative only, and changes may be made in detail, especially in matters of structure and arrangement of parts to the full extent indicated by the broad general meaning of the terms in which the appended claims are expressed. For example, the particular elements may vary depending on the particular application for the voltage regulator while maintaining substantially the same functionality. In addition, although the preferred aspects described herein are directed to a data storage device for connection to a computer, it will be appreciated by those skilled in the art that the teachings herein can be applied to voltage regulator for other applications without departing from the scope and spirit of the present invention.

What is claimed is:

1. A controller, comprising:
a hysteretic circuit that generates a hysteretic voltage output as a function of a regulated voltage and that generates a hysteretic current output as a function of an inductor current; and
a switch control circuit that provides a quasi-continuous control output as a function of the hysteretic current output from a start time when the regulated voltage rises above a higher hysteretic voltage until a stop time when the regulated voltage falls below a lower hysteretic voltage.

2. The controller of claim 1 wherein the hysteretic circuit comprises a voltage threshold coupled to a hysteretic voltage comparator.

3. The controller of claim 1 wherein the hysteretic circuit comprises a current threshold coupled to a hysteretic current comparator.

4. The controller of claim 1 wherein the switch control circuit comprises a latch that asynchronously controls the quasi-continuous control output.

5. The controller of claim 1 wherein the hysteretic circuit comprises a synchronous gate driver that synchronizes the quasi-continuous control output with a rectifier element control output.

6. The controller of claim 1 further comprising at least one current sensor input pin coupled to the hysteretic circuit.

7. The controller of claim 1 further comprising a ramp generator coupled to the hysteretic circuit.

8. A voltage regulator, comprising:
an output circuit that comprises an inductor and a switch that couples a first polarity supply voltage to the inductor to produce an inductor current; and the output circuit provides an opposite polarity regulated voltage;

a hysteretic circuit that generates a hysteretic voltage output as a function of the regulated voltage and that generates a hysteretic current output as a function of the inductor current; and a switch control circuit that provides a quasi-continuous control output to the switch as a function of the hysteretic current output from a start time when the regulated voltage rises above a higher hysteretic voltage until a stop time when the regulated voltage falls below a lower hysteretic voltage.

9. The voltage regulator of claim 8 wherein the quasi-continuous control output shuts off the switch when the regulated voltage falls below the lower hysteretic voltage.

10. The voltage regulator of claim 8 wherein the output circuit comprises a capacitor and a rectifier element that rectifies current that flows between the inductor and the capacitor.

11. The voltage regulator of claim 10 wherein the rectifier element comprises a Schottky diode.

12. The voltage regulator of claim 10 wherein the rectifier element comprises a field effect transistor.

13. The voltage regulator of claim 8 wherein the inductor comprises a single two-terminal inductor.

14. The voltage regulator of claim 8 wherein the inductor comprises a soft magnetic core.

15. A method of a voltage regulation, comprising:

coupling a first polarity supply voltage to an inductor through a switch to produce an inductor current;

generating an opposite polarity regulated voltage from the inductor current;

generating a hysteretic voltage output as a function of the regulated voltage and generating a hysteretic current output as a function of the inductor current; and providing a quasi-continuous control output to the switch as a function of the hysteretic current output from a start time when the regulated voltage rises above a higher hysteretic voltage until a stop time when the regulated voltage falls below a lower hysteretic voltage.

16. The method of claim 15, comprising:

shutting off the switch when the regulated voltage falls below the lower hysteretic voltage.

17. The method of claim 15, comprising:

rectifying a current flowing from the inductor to a capacitor.

18. The method of claim 15, comprising:

asynchronously controlling the quasi-continuous control output.

19. The method of claim 15, comprising:

synchronously controlling the quasi-continuous control output.

\* \* \* \* \*